United States Patent
Yamanaka et al.

(10) Patent No.: US 9,317,454 B2
(45) Date of Patent: Apr. 19, 2016

(54) INFORMATION PROCESSING APPARATUS, INFORMATION PROCESSING METHOD, AND RECORDING MEDIUM

(71) Applicant: FUJITSU LIMITED, Kawasaki-shi, Kanagawa (JP)

(72) Inventors: Hideki Yamanaka, Yokohama (JP); Takashi Okuno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 78 days.

(21) Appl. No.: 13/835,983

(22) Filed: Mar. 15, 2013

(65) Prior Publication Data
US 2013/0263159 A1 Oct. 3, 2013

(30) Foreign Application Priority Data

Mar. 30, 2012 (JP) .................... 2012-082565

(51) Int. Cl.
*G06F 9/54* (2006.01)
*G06F 13/10* (2006.01)
(52) U.S. Cl.
CPC .................... *G06F 13/102* (2013.01)
(58) Field of Classification Search
CPC .................................................. G06F 13/102
See application file for complete search history.

(56) References Cited

U.S. PATENT DOCUMENTS

| | | | |
|---|---|---|---|
| 8,463,951 B1* | 6/2013 | Priem | 710/10 |
| 2002/0095501 A1* | 7/2002 | Chiloyan et al. | 709/227 |
| 2006/0037029 A1* | 2/2006 | Yamada | 719/327 |
| 2008/0127225 A1* | 5/2008 | Mullis et al. | 719/321 |
| 2008/0195768 A1* | 8/2008 | Lowe et al. | 710/14 |
| 2010/0079782 A1* | 4/2010 | Tsuya et al. | 358/1.13 |
| 2011/0276724 A1* | 11/2011 | Mullis et al. | 710/8 |
| 2012/0226828 A1* | 9/2012 | Uehara | 710/8 |

FOREIGN PATENT DOCUMENTS

JP 2010-257411 11/2010

* cited by examiner

*Primary Examiner* — Syed Roni
(74) *Attorney, Agent, or Firm* — Staas & Halsey LLP

(57) ABSTRACT

An information processing apparatus includes a memory configured to store information that indicates a correspondence relationship between location information indicating a connection position of a device to a bus and driver information indicating a device driver corresponding to the device; and a processor coupled to the memory and configured to associate a device that is connected to the connection position with a device driver indicated by the driver information stored in the memory.

19 Claims, 14 Drawing Sheets

FIG. 7

| REGISTERED DRIVER NAME | PCI CARD INDICATED BY DEVICE MANAGEMENT BOOK DURING LOOP | DETERMINATION IN STEP 108 | DETERMINATION IN STEP 110 | DETERMINATION IN STEP 112 | DETERMINATION IN STEP 116 | WHETHER DRIVER IS REGISTERED TO DEVICE |
|---|---|---|---|---|---|---|
| DRIVER_A | PCI CARD 84 | Y | N | N | – | Y |
| | PCI CARD 85 | Y | N | N | – | Y |
| | PCI CARD 86 | Y | N | N | – | Y |
| | PCI CARD 87 | Y | Y | – | N | N |
| | PCI CARD 88 | Y | Y | – | N | N |
| | ANOTHER CARD | N | – | – | – | N |
| DRIVER_B | PCI CARD 84 | Y | N | Y | – | N |
| | PCI CARD 85 | Y | N | Y | – | N |
| | PCI CARD 86 | Y | N | Y | – | N |
| | PCI CARD 87 | Y | Y | – | Y | Y |
| | PCI CARD 88 | Y | Y | – | Y | Y |
| | ANOTHER CARD | N | – | – | – | N |
| ANOTHER DRIVER | PCI CARD 84 | N | – | – | – | N |
| | PCI CARD 85 | N | – | – | – | N |
| | PCI CARD 86 | N | – | – | – | N |
| | PCI CARD 87 | N | – | – | – | N |
| | PCI CARD 88 | N | – | – | – | N |

130

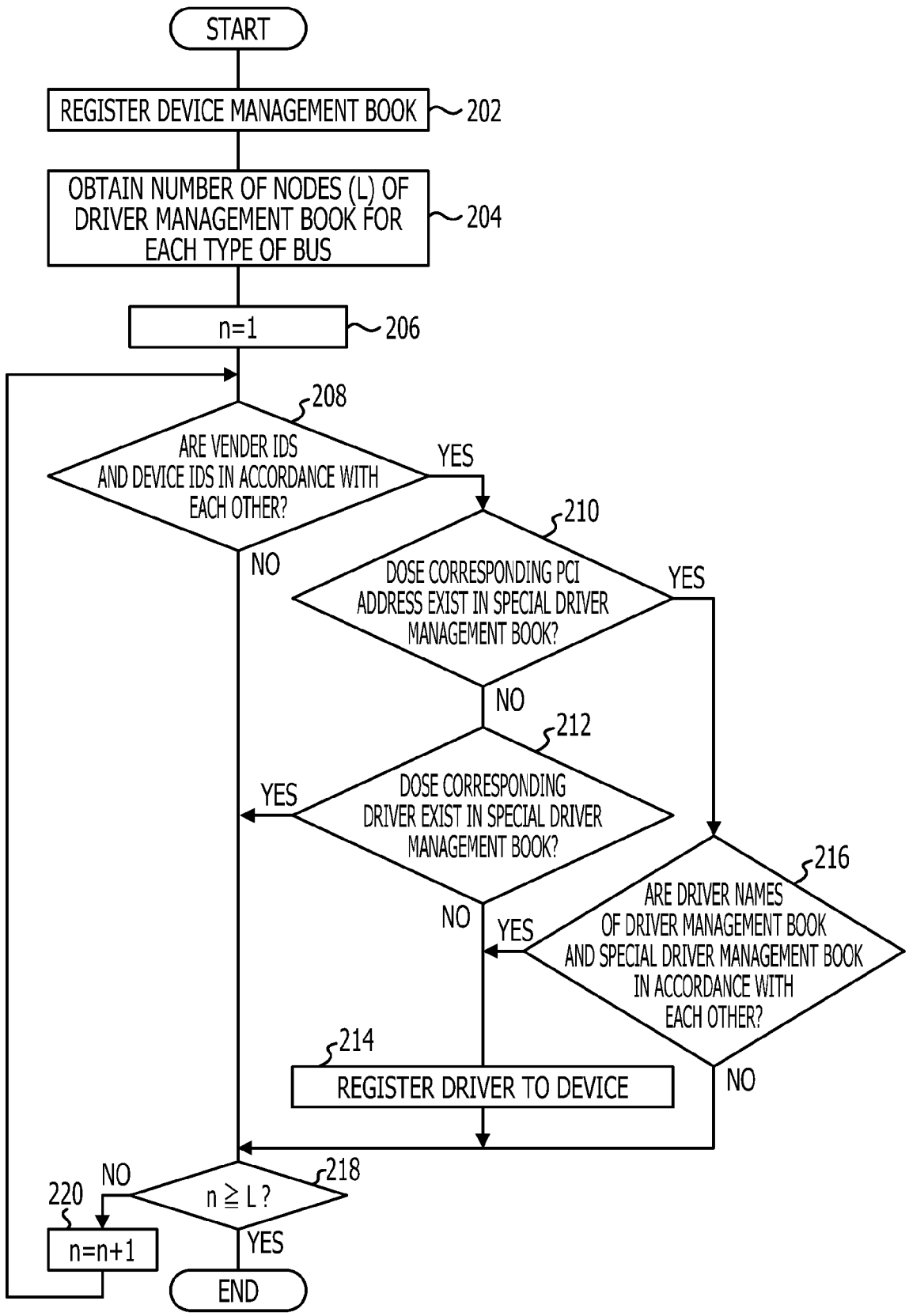

FIG. 9

| REGISTERED DRIVER NAME | DEVICE NAME INDICATED BY DEVICE MANAGEMENT BOOK DURING LOOP | DETERMINATION IN STEP 208 | DETERMINATION IN STEP 210 | DETERMINATION IN STEP 212 | DETERMINATION IN STEP 216 | WHETHER DRIVER IS REGISTERED TO DEVICE |
|---|---|---|---|---|---|---|
| PCI CARD 84 | DRIVER_A | Y | N | N | – | Y |
|  | DRIVER_B | Y | N | Y | – | N |
|  | ANOTHER DRIVER | N | – | – | – | N |
| PCI CARD 85 | DRIVER_A | Y | N | N | – | Y |
|  | DRIVER_B | Y | N | Y | – | N |
|  | ANOTHER DRIVER | N | – | – | – | N |
| PCI CARD 86 | DRIVER_A | Y | N | N | – | Y |
|  | DRIVER_B | Y | N | Y | – | N |
|  | ANOTHER DRIVER | N | – | – | – | N |
| PCI CARD 87 | DRIVER_A | Y | Y | – | N | Y |
|  | DRIVER_B | Y | Y | – | Y | N |
|  | ANOTHER DRIVER | N | – | – | – | N |
| PCI CARD 88 | DRIVER_A | Y | Y | – | N | Y |
|  | DRIVER_B | Y | Y | – | Y | N |
|  | ANOTHER DRIVER | N | – | – | – | N |
| ANOTHER CARD | DRIVER_A | N | – | – | – | N |
|  | DRIVER_B | N | – | – | – | N |

230

INFORMATION PROCESSING APPARATUS, INFORMATION PROCESSING METHOD, AND RECORDING MEDIUM

CROSS-REFERENCE TO RELATED APPLICATION

This application is based upon and claims the benefit of priority from the prior Japanese Patent Application No. 2012-082565 filed on Mar. 30, 2012, the entire contents of which are incorporated herein by reference.

FIELD

The embodiments are related to an information processing apparatus, an information processing method, and a recording medium.

BACKGROUND

A computer system includes a bus as a data transmission path through which devices are connected each other in the computer system. As an example of a bus, a peripheral component interconnect (PCI) bus is known. A device driver that controls a PCI device is associated with the PCI device connected to the PCI bus. In an operating system of the computer system, one type of given device driver is used in order to control the PCI device that is connected to the PCI bus. Generally, one type of device driver is registered to a corresponding type of PCI device to control the PCI device in the operating system of the computer system.

In the computer system, a vender ID and device ID, which are given to a PCI device, are generally used to identify a PCI device to which a device driver corresponds. Thus, one type of device driver is registered to a PCI device that is identified by the certain combination of a vender ID and device ID. An example of a case is described below in which a device driver is registered.

A PCI device includes a unique vender ID and device ID for each type of PCI device. An example is described using a PCI card that includes a unique vender ID and device ID as a PCI device. Registration of a device driver in the computer system is conducted by registering a vender ID and device ID of a PCI card to be controlled, which are associated with the device driver, to an operating system, or a kernel. In the kernel, a table that associates a vender ID and device ID with a device driver is established beforehand. The kernel calls a device driver that corresponds to a vender ID and device ID with reference to the table established beforehand when a PCI card is detected.

For devices including the same vender ID and device ID, a plurality of types of device drivers may be registered to the kernel. However, when the plurality of types of device drivers are registered to the kernel, the devices may be associated with each of the device drivers, so that a malfunction may occur.

As a technique by which a single device can serve as a plurality of devices, a technique is known by which a PCI card having a single function is operated as a multifunction PCI card. In this technique, hardware functions are operated independently by providing a multifunctional driver between the device drivers and the PCI card.

SUMMARY

According to an aspect of the invention, an information processing apparatus includes a memory configured to store information that indicates a correspondence relationship between location information indicating a connection position of a device to a bus and driver information indicating a device driver corresponding to the device; and a processor coupled to the memory and configured to associate a device that is connected to the connection position with a device driver indicated by the driver information stored in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is an illustrative diagram of a course of the device driver initialization processing;

FIG. 8 is a flowchart indicating the detailed flow of the device detection processing;

FIG. 9 is an illustrative diagram of a course of the device detection processing;

DESCRIPTION OF EMBODIMENTS

In related art, a PCI card having a single function may be independently operated as a multifunction PCI card, however, it is difficult to operate a plurality of PCI cards independently. For example, device drivers are difficult to be respectively registered to a plurality of PCI devices that includes the identical combination of a vender ID and device ID.

According to the embodiments, a specified device driver is registered to at least one of a plurality of devices having an identical type.

Examples of the embodiments are described below in detail with reference to accompanying drawings.

First Embodiment

Figure 1:
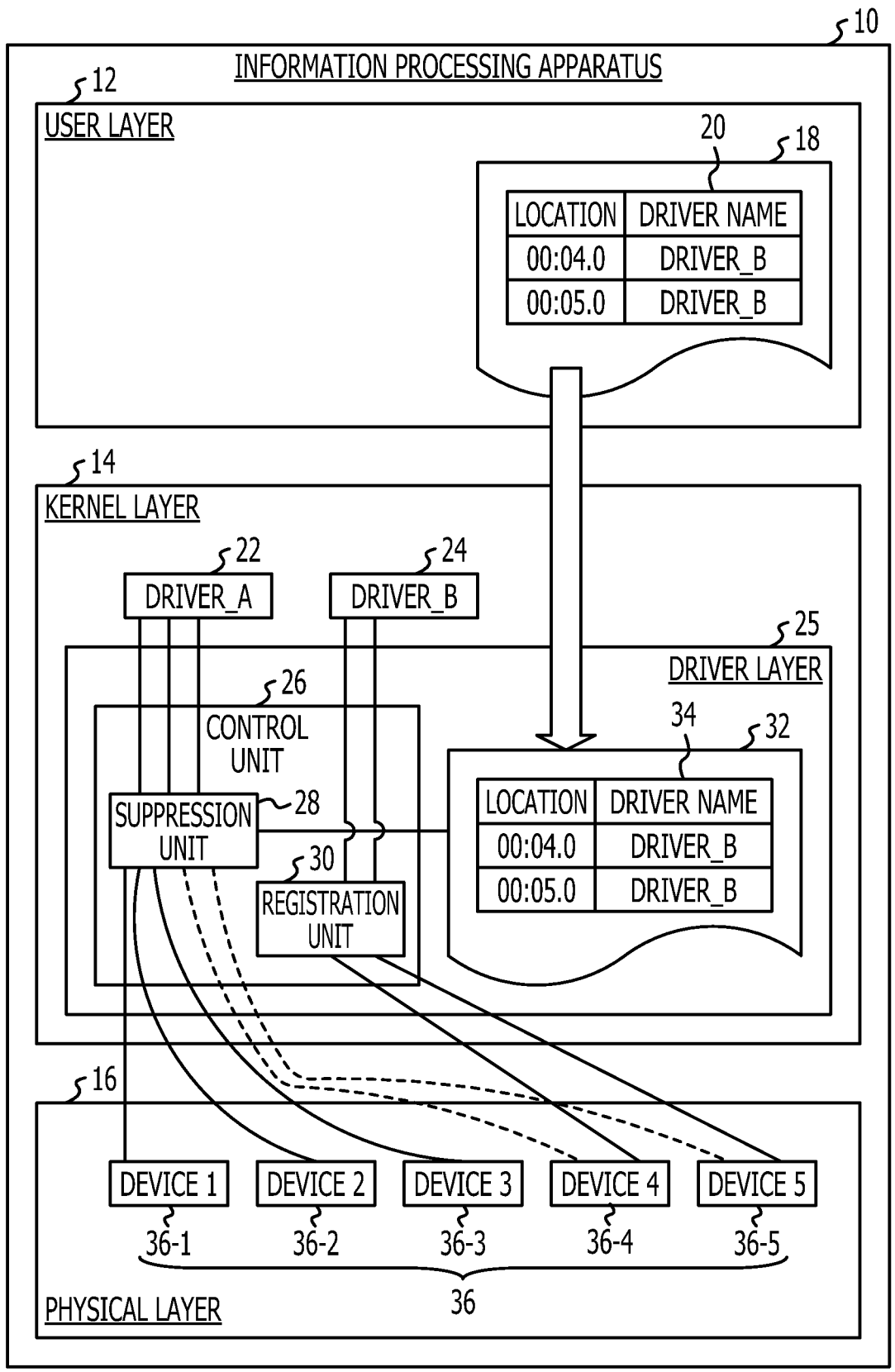
FIG. 1 is a block diagram illustrating a schematic configuration of an information processing apparatus according to an embodiment.

In FIG. 1, an information processing apparatus 10 according to an embodiment is illustrated. The information processing apparatus 10 is a computer system, etc., and includes a user layer 12, a kernel layer 14, and a physical layer 16 as a conceptual configuration using a hardware resource and a software resource. The user layer 12 is an operating portion in the information processing apparatus 10 when a user operates the information processing apparatus 10. The kernel layer 14 is a kernel portion by the operating system. The physical layer 16 is an example of a portion that indicates a physical device such as a PCI device.

In the user layer 12, a specified device driver is associated with a device that is specified by the user, and identification information 20 used to uniquely identify a device is stored in an input area 18. The identification information 20 having been stored in the input area 18 is stored in a storage unit 32 of the kernel layer 14 as identification information 34 beforehand. Thus, in the storage unit 32 of the kernel layer 14, the identification information 34 used to uniquely identify a device, which is connected to a bus and uses a device driver specified beforehand, is stored. The kernel layer 14 includes a device driver 22 (indicated as "driver_A" in FIG. 1), a device driver 24 (indicated as "driver_B" in FIG. 1), and a driver layer 25. The driver layer 25 includes a control unit 26 and the storage unit 32. The control unit 26 includes a suppression unit 28 and a registration unit 30. The physical layer 16 includes five devices such as PCI devices 36-1 to 36-5.

The information processing apparatus 10 is an example of an information processing apparatus according to the embodiment.

When the user associates a specified device driver with a specified device, the user operates the information processing apparatus 10. By the operation by the user, in the user layer 12 of the information processing apparatus 10, the identification information 20 used to uniquely identify a device that uses a device driver specified by the user is stored in the input area 18. The identification information 20 having been stored in the input area 18 is stored in the storage unit 32 of the kernel layer 14 as the identification information 34. To simplify the following description, an example is described in which five PCI devices are included in the physical layer 16. The user associates information that indicates an installation position of a PCI device with the name of a device driver and registers the associated information and name, as the identification information 20. The information indicating the installation position of the PCI device includes PCI address information of the PCI device. The PCI address information includes information that associates a bus number, a device number, and a function number as an example, and a device on a PCI bus may be identified by the PCI address information.

In addition, the identification information 20 having been stored in the input area 18 is stored in the storage unit 32 of the kernel layer 14, as the identification information 34. In the kernel layer 14, when each of the PCI devices 36-1 to 36-5 of the physical layer 16 is associated with the device driver 22 (driver_A) or the device driver 24 (driver_B), the control unit 26 associates a PCI device with a device driver. The PCI devices 36-1 to 36-5 of the physical layer 16 are PCI devices having an identical type, and a regular device driver that is associated with a device ID and a vender ID is the device driver 22 (driver_A). In addition, in the first embodiment, in each of the PCI devices 36-4 and 36-5 of the PCI devices 36-1 to 36-5, the identification information 34 that is associated with the device driver 24 (driver_B) is stored in the storage unit 32 of the kernel layer 14.

The control unit 26 determines whether or not the PCI device 36-1 corresponds to information (PCI address information) indicating an installation position of the PCI device, with reference to the identification information 34 of the storage unit 32 in the suppression unit 28, in order to associate the PCI device 36-1 with a device driver. The PCI device 36-1 does not correspond to the information (PCI address information) indicating the installation position of the PCI device based on the identification information 34 of the storage unit 32, and the device driver 22 (driver_A) that is normally associated with the PCI device 36-1 is registered to the PCI device. Similarly, the device driver 22 (driver_A) that is normally associated with the PCI devices 36-2 and 36-3 is registered to the PCI devices 36-2 and 36-3.

On the other hand, when the control unit 26 associates the PCI device 36-4 with a device driver, the installation position of the PCI device 36-4 corresponds to the installation position of a PCI device based on the identification information 34 of the storage unit 32. The suppression unit 28 suppresses the association of the PCI device 36-4 with the device driver 22 (driver_A) that is normally associated with the PCI device 36-4. After that, the control unit 26 determines whether or not the PCI device 36-4 corresponds to PCI address information, with reference to the identification information 34 of the storage unit 32 in the registration unit 30. The PCI device 36-4 corresponds to the PCI address information based on the identification information 34 of the storage unit 32, and the registration unit 30 registers the PCI device 36-4 that is associated with a device driver based on the name (driver name) of a device driver of the identification information 34. That is, the registration unit 30 registers the PCI device 36-4 that is associated with the device driver 24 (driver_B). Similarly, when the registration unit 30 associates the PCI device 36-5 with a device driver, registration is performed on the PCI device 36-5 associated with the device driver 24 (driver_B).

As described above, a desired device driver is registered to a desired device by the user.

Figure 2:
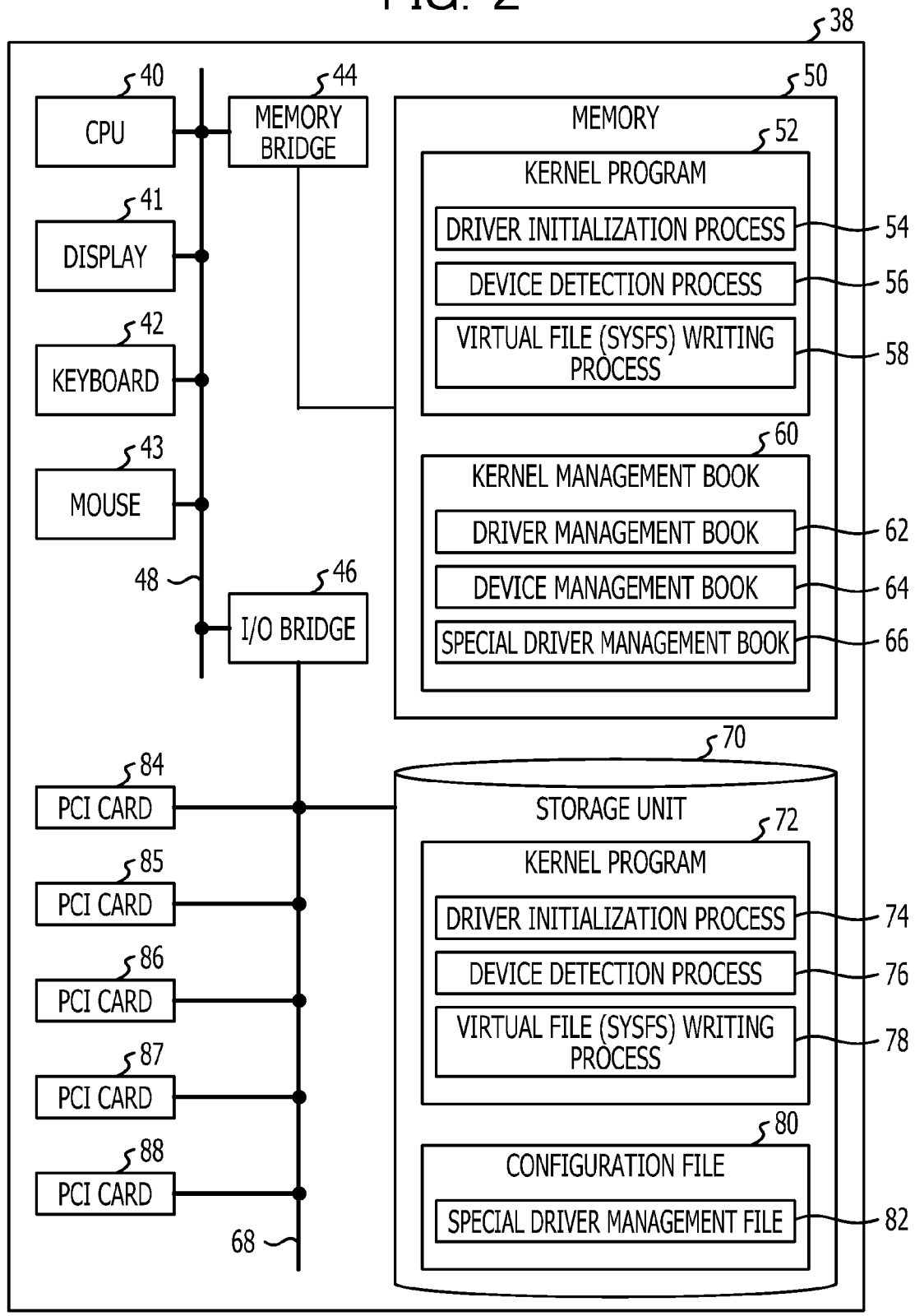
FIG. 2 is a schematic block diagram of a computer system that functions as the information processing apparatus.

The information processing apparatus 10 may be realized, for example, by a computer system 38 illustrated in FIG. 2. The computer system 38 includes a CPU 40, a display 41, a keyboard 42, a mouse 43, a memory bridge 44, and an input output port bridge (I/O bridge) 46, and these are connected to each other through a bus 48. A memory 50 is connected to the memory bridge 44. A plurality of PCI cards are connected to the I/O bridge 46 through a PCI bus 68. An example is described below in which five PCI cards 84 to 88 as PCI devices are connected to each other.

In addition, a nonvolatile storage unit 70 is connected to the I/O bridge 46 through the PCI bus 68. The storage unit 70 may be realized by a hard disk drive (HDD), a flash memory, etc. A kernel program 72 to be used to cause the computer system 38 to function as the information processing apparatus 10 is stored in the storage unit 70 as a recording medium. In addition, a setting file 80 that includes a special driver management file 82 is stored in the storage unit 70. The special driver management file 82 corresponds to the identification information 34 (also see FIG. 1) for uniquely identifying a device that uses a device driver specified by the user. The CPU 40 reads the kernel program 72 from the storage unit 70, loads the read kernel program 72 into the memory 50, and sequentially executes processes included in the kernel program 72. That is, the kernel program 72 of the storage unit 70 is loaded into the memory 50 as an executable kernel program 52, and the CPU 40 sequentially executes processes included in the loaded kernel program 52.

The kernel program 72 stored in the storage unit 70 includes a driver initialization process 74, a device detection process 76, and a virtual file (sysfs) writing process 78. The CPU 40 operates as the control unit 26 illustrated in FIG. 1 by executing the driver initialization process 74, the device detection process 76, and the virtual file (sysfs) writing process 78. That is, the information processing apparatus 10 is realized by the computer system 38, and the computer system 38 operates as the control unit 26 (FIG. 1) by executing the driver initialization process 74, the device detection process 76, and the virtual file writing process 78.

The driver initialization process 74, the device detection process 76, and the virtual file writing process 78, which are included in the kernel program 72, are loaded into the memory 50. A driver initialization process 54, a device detection process 56, and a virtual file writing process 58 are generated in the memory 50 by the loading of the kernel program 72 to the memory 50. In addition, as described in detailed later, some areas of the memory 50 are used for storing information that is obtained by the processing of the kernel program 72 (loaded kernel program 52). When the CPU 40 executes the driver initialization process 54, the device detection process 56, and the virtual file writing process 58, which are loaded into the memory 50, a kernel management book 60 is generated. The kernel management book 60 includes a driver management book 62, a device management book 64, and a special driver management book 66.

The kernel program 72 and the loaded kernel program 52 are examples of an information processing program according to the embodiment. That is, the kernel program 72 (loaded kernel program 52) is an example of an information processing program that is used to cause the computer system 38 to function as the information processing apparatus 10.

In addition, the PCI cards 84 to 88 according to the first embodiment correspond to the PCI devices 36-1 to 36-5 of FIG. 1. In addition, a storage area of the setting file 80 that is included in the storage unit 70 of the computer system 38 corresponds to the storage unit 32 of FIG. 1. In addition, the kernel management book 60 of the memory 50, which is described later, may correspond to the identification information 34 that is referred to when the control unit 26 of FIG. 1 is executed.

In the first embodiment, an example is described in which the five PCI cards 84 to 88 are regarded as a PCI device, however, the number of PCI cards is not limited to five, and may be two or more.

An operation according to the first embodiment is described below.

First, for a plurality of PCI cards each of which includes identification information including an identical vender ID and device ID, registration of a special device driver to a certain installation position may be requested. As an example, when protocols are layered in a host bus adapter (HBA) of a fiber channel, it is probable that registrations of different device drivers are requested for respective functions on which mapping on an upper layer is performed. In addition, as another example, it is probable that registration of another device driver is requested on a trial basis in order to avoid and suppress function reduction (level down) due to upgrade of a device driver. That is, it is probable that an upgraded device driver is applied for a certain PCI card, and verification of the upgraded device driver is requested.

Therefore, in the first embodiment, an installation position and driver name of a PCI card are given as information, and a target device driver is registered to a target PCI card. For example, an installation position of a PCI card is specified for a kernel, and a device driver to be registered to the PCI card of the specified installation position is specified for the kernel. In addition, for the PCI card of the specified installation position, registration of a device driver that is normally registered is suppressed. On the other hand, different device drivers may be registered to respective installation positions by registering the specified device driver to the PCI card of the specified installation position even when the PCI cards has an identical type.

Next, an operation of the information processing apparatus 10 that is realized by the computer system 38 is described in detail with reference to FIGS. 3 to 13. The processing in the computer system 38 according to the first embodiment is initialization processing of a device driver for a PCI card connected to the PCI bus 68 and detection processing of the PCI card, from among programs included in the operating system.

First, the CPU 40 of the computer system 38 executes processes included in the kernel program 72 that is stored in the storage unit 70. Specifically, the CPU 40 of the computer system 38 loads the processes, which are included in the kernel program 72 of the storage unit 70, into the memory 50 and then executes the processes. More specifically, the CPU 40 executes the driver initialization process 54, the device detection process 56, and the virtual file writing process 58 that have been loaded into the memory 50. As a result, each of the processing routines illustrated in FIGS. 3 to 5 may be executed.

Figure 3:
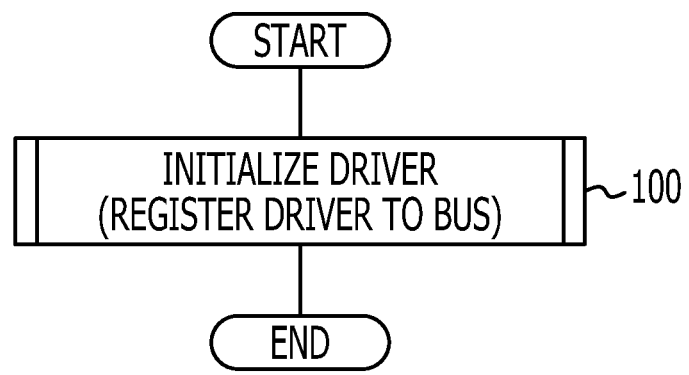
FIG. 3 is a flowchart indicating a flow of device driver initialization processing.
Figure 4:
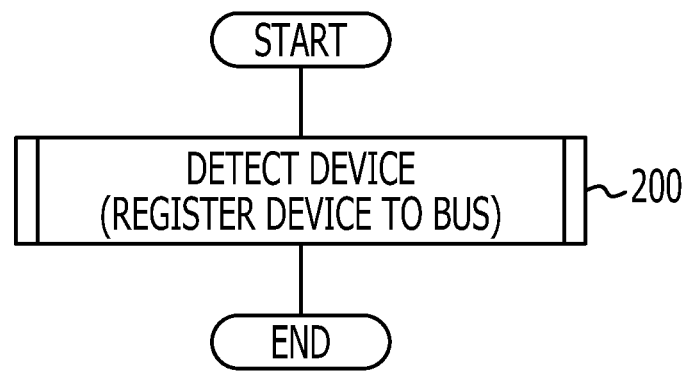
FIG. 4 is a flowchart indicating a flow of device detection processing.
Figure 5:
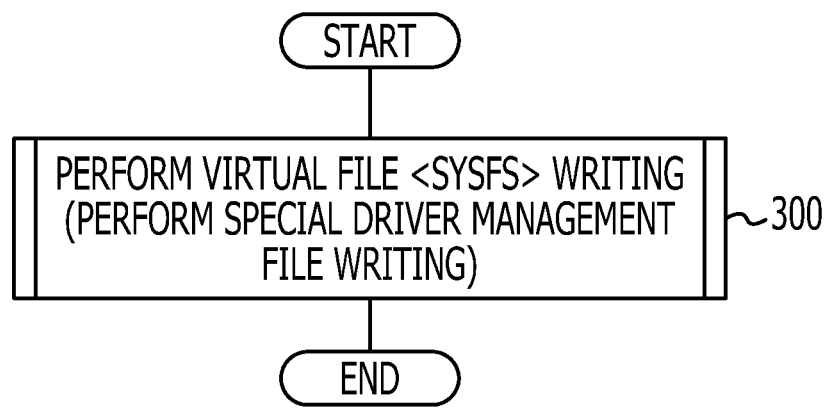
FIG. 5 is a flowchart indicating a flow of virtual file writing processing.

FIG. 3 is a flowchart indicating a flow of driver initialization processing that corresponds to the driver installation process. The information processing apparatus 10 is realized by the computer system 38, and the computer system 38 operates as a part of the control unit 26 (FIG. 1) when the CPU 40 executes the driver initialization process 54 that is loaded into the memory 50. In addition, FIG. 4 is a flowchart indicating a flow of device detection processing that corresponds to the device detection process. The information processing apparatus 10 is realized by the computer system 38, and the computer system 38 operates as a part of the control unit 26 (FIG. 1) when the CPU 40 executes the device detection process 56 that is loaded into the memory 50. In addition, FIG. 5 is a flowchart indicating a flow of virtual file writing processing that corresponds to the virtual file writing process. The information processing apparatus 10 is realized by the computer system 38, and the computer system 38 operates as a part of the control unit 26 (FIG. 1) when the CPU 40 executes the virtual file writing process 58 that is loaded into the memory 50.

As illustrated in FIG. 3, in the driver initialization process, in Step 100, registration processing of a device driver to the PCI bus 68 is executed. In addition, as illustrated in FIG. 4, in the device detection processing, in Step 200, registration processing of a PCI card to the PCI bus 68 is executed. In addition, in the first embodiment, in the driver initialization process and the device detection process, the virtual file writing processing is also executed in order to register a device driver that is specified by the user to a PCI card specified by the user. That is, as illustrated in FIG. 5, in Step 300, the virtual file writing processing that corresponds to the virtual file writing process is executed. The virtual file writing processing according to the first embodiment is one of programs that are included and executed in the operating system.

Each of the driver initialization processing (FIG. 3), the device detection processing (FIG. 4), and the virtual file writing processing (FIG. 5) is included and executed in the operating system. In addition, execution order of the pieces of processing is determined when power is supplied to the computer system 38 or when a device such a hot plug is physically added and deleted to and from the computer system 38. That is, any of the driver initialization processing (FIG. 3), the device detection processing (FIG. 4), and the virtual file writing processing (FIG. 5) may be executed first. In addition, the execution order of the pieces of processing is controlled so that a device driver and a PCI card are operable after registration of association of the device driver and the PCI card is performed.

In the driver initialization processing (FIG. 3), registration of a first or driver management book 62 is performed, and in the device detection processing (FIG. 4), registration of the device detection process 56 is performed.

As described later, each of the driver management book 62 and a device management book 64 is a data group in which a unique management book is connected to one element (device driver and device) and that has a link list structure for each type of bus (also see FIG. 10). As the type of bus, a PCI bus, a USB bus, and the other buses are known, and in the first embodiment, the PCI bus 68 is described as an example. The link list structure is a set of nodes that are connected to each other through a pointer, and data and a pointer that indicates a next link (the position of a next node) are stored in each of the nodes.

Figure 6:
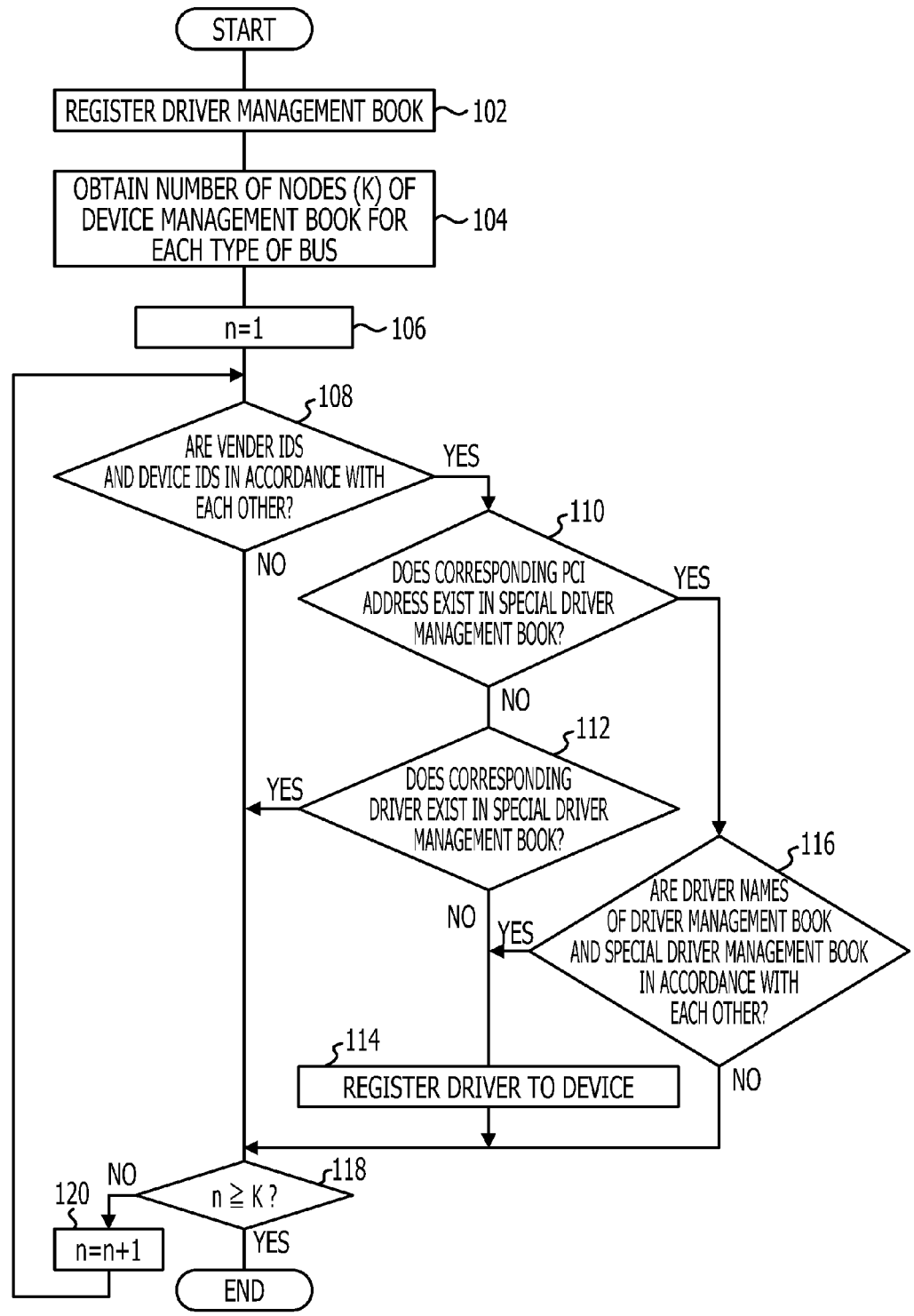
FIG. 6 is a flowchart indicating the detailed flow of the device driver initialization processing.

Next, the driver initialization processing (FIG. 3) is described in detail. In Step 100 of FIG. 3, the processing routine that is illustrated in FIG. 6 is executed.

First, in Step 102, the registration processing of the driver management book 62 is executed. The registration processing of the driver management book 62 is executed for each node of the driver management book 62 of the data group having a link list structure for each type of bus (also see FIG. 10). In the first embodiment, for the PCI bus 68, the registration processing is executed for each of the nodes of the driver management book 62 of the data group having a link list structure. In following Step 104, the number of nodes of the device management book 64 for each type of bus is obtained. In the first embodiment, for the PCI bus 68, the number of nodes "K" of the device management book 64 is obtained. In following Step 106, a variable "n" is initialized (n=1 is set), and the flow proceeds to Step 108. In Step 108, it is determined whether or not a vender ID and device ID of a node of the driver management book 62 that is registered in Step 102 is in accordance with a vender ID and device ID of the device management book 64 that is an n-th node. When "No" is determined in Step 108, the variable "n" varies and "No" is repeatedly determined until the vender IDs and the device IDs are in accordance with each other. That is, when "No" is determined in Step 108, the "No" is repeatedly determined until the variable "n" becomes the number of nodes of the device management book 64 (until n≥K is satisfied). When "No" is determined in Step 118, the variable "n" is incremented (n=n+1) in Step 120, and the flow returns to Step 108. On the other hand, when "Yes" is determined in Step 118, that is, the variable "n" becomes the number of nodes of the device management book 64, the routine ends.

When "Yes" is determined in Step 108, the flow proceeds to Step 110, and it is determined whether or not a corresponding PCI address exists in a second or special driver management book 66 that is described later. When "No" is determined in Step 110, the flow proceeds to Step 112, and it is determined whether or not a corresponding device driver exists in the special driver management book 66. When "Yes" is determined in Step 112, the flow proceeds to Step 118. On the other hand, when "No" is determined in Step 112, the driver is registered to the device in Step 114, and the flow proceeds to Step 118.

In addition, when "Yes" is determined in Step 110, the flow proceeds to Step 116, and it is determined whether or not the driver name of the driver management book 62 is in accordance with the driver name of the special driver management book 66. When "No" is determined in Step 116, the flow proceeds to Step 118. On the other hand, when "Yes" is determined in Step 116, the driver is registered to the device in Step 114, and the flow proceeds to Step 118.

FIG. 7 illustrates a determination result in the course of the processing and the presence or absence of registration of a device driver, for the PCI cards 84 to 88 that are included in the computer system 38, in the processing of FIG. 6, as a the list 130.

In the driver initialization processing that is illustrated in FIG. 6, the processing in which the flow proceeds to Step 118 without performing registration of a device driver by determining "No" in Step 108, determining "Yes" in Step 112, and determining "No" in Step 116 corresponds to a function of the suppression unit 28 of FIG. 1. In addition, by determining "No" in Step 112 and determining "Yes" in Step 116, the processing to perform registration of a device driver in Step 114 corresponds to a function of the registration unit 30 of FIG. 1.

Next, the device detection processing (FIG. 4) is described in detail. In Step 200 of FIG. 4, the processing routine that is illustrated in FIG. 8 is executed.

First, in Step 202, the registration processing of the device management book 64 is executed. The registration processing of the device management book 64 is executed for each node of the device management book 64 of a data group having a link list structure for each type of bus (also see FIG. 10). In the first embodiment, the registration processing executed for each of the nodes of the device management book 64 of the data group having a link list structure of the PCI bus 68. In following Step 204, the number of driver management books 62 for each type of bus, that is, the number of nodes "L" is obtained. In the first embodiment, the number of nodes "L" of the driver management book 62 of the PCI bus 68 is obtained. In following Step 206, a variable "n" is initialized (n=1 is set), and the flow proceeds to Step 208. In Step 208, it is determined whether or not a vender ID and device ID of a node of the device management book 64 that is registered in Step 202 is in accordance with a vender ID and device ID of the driver management book 62 that is an n-th node. When "No" is determined in Step 208, the variable "n" varies and "No" is repeatedly determined until the vender IDs and the device IDs are in accordance with each other. That is, when "No" is determined in Step 208, the "No" is repeatedly determined until the variable "n" becomes the number of nodes of the device management book 62 (until n≥L is satisfied). When "No" is determined in Step 218, the variable "n" is incremented (n=n+1) in Step 220, and the flow returns to Step 208. On the other hand, when "Yes" is determined in Step 218, that is, the variable "n" becomes the number of nodes of the device management book 62, the routine ends.

When "Yes" is determined in Step 208, the flow proceeds to Step 210, it is determined whether or not a corresponding PCI address exists in the special driver management book 66 that is described later. When "No" is determined in Step 210, the flow proceeds to Step 212, and it is determined that a corresponding device driver exists in the special driver management book 66. When "Yes" is determined in Step 212, the flow proceeds to Step 218. On the other hand, when "No" is determined in Step 212, the driver is registered to the device in Step 214, and the flow proceeds to Step 218.

In addition, when "Yes" is determined in Step 210, the flow proceeds to Step 216, and it is determined whether or not the driver name of the driver management book 62 is in accordance with the driver name of the special driver management book 66. When "No" is determined in Step 216, the flow proceeds to Step 218. On the other hand, when "Yes" is determined in Step 216, the driver is registered to the device in Step 214, and the flow proceeds to Step 218.

FIG. 9 illustrates a determination result in the course of the processing and the presence or absence of registration of a device driver, for the PCI cards 84 to 88 that are included in the computer system 38, in the processing of FIG. 8, as a list 230.

In the processing that is illustrated in FIG. 8, the processing in which the flow proceeds to Step 218 without performing registration of a device driver by determining "No" in Step 208, determining "Yes" in Step 212, and determining "No" in Step 216 corresponds to a function of the suppression unit 28 of FIG. 1. In addition, by determining "No" in Step 212 and determining in "Yes" in Step 216, the processing to perform registration of a device driver in Step 214 corresponds to a function of the registration unit 30 of FIG. 1.

Figure 10:
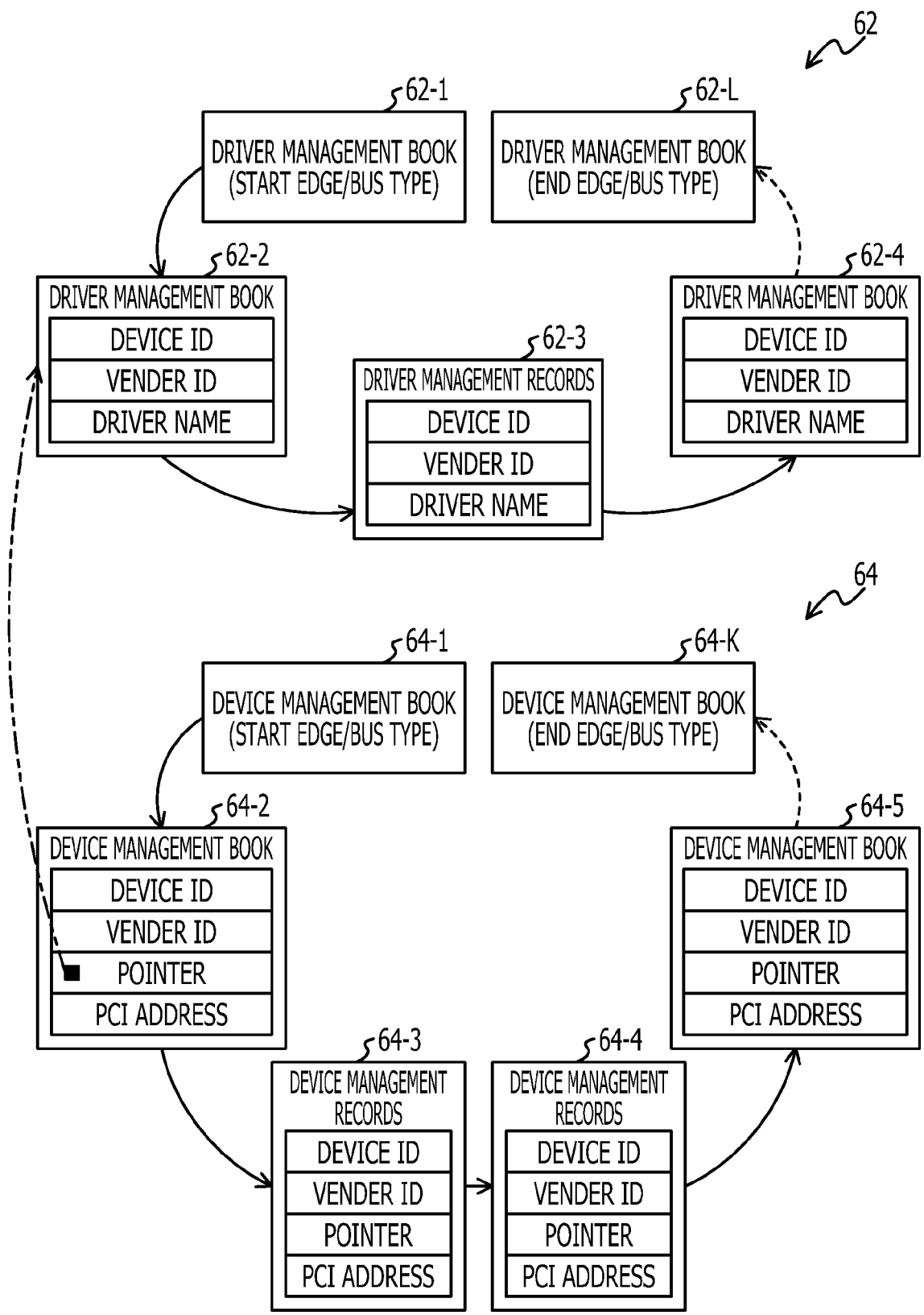
FIG. 10 is a schematic diagram of a driver management book and a device management book.

FIG. 10 is a schematic diagram of the driver management book 62 and the device management book 64. In FIG. 10, illustration of a pointer indicating a next link that is included in each node is omitted. In the driver management book 62, connection of nodes is performed in turn from the driver management book 62-1 that is a node of start edge through driver management books 62-2, 62-3, 62-4, . . . , 62-L ("L" indicates the number of nodes). In the first embodiment, the driver management book 62 of each of the nodes includes a device ID, a vender ID, and a driver name that indicates the name of a device driver, as data.

In addition, in the device management book 64, connection of nodes is performed in turn from the device management book 64-1 that is a node of end edge through device management books 64-2, 64-3, 64-4, 64-5, . . . , 64-K ("K" indicates the number of nodes). In the first embodiment, the device management book 64 of each of the nodes includes a device ID, a vender ID, a pointer indicating association with a driver, and information indicating a PCI address, as data. The pointer, which indicates association with a driver, is data that indicate association of a device with a device driver that controls the device. As an example of a pointer that indicates association with a driver, there is data that indicates a position of a node of the driver management book 62 (the association is illustrated by two-dot chain line in FIG. 10).

Next, the virtual file writing process (FIG. 5) is described in detail. In Step 300 of FIG. 5, the processing routine that is illustrated in FIG. 11 is executed.

Figure 11:
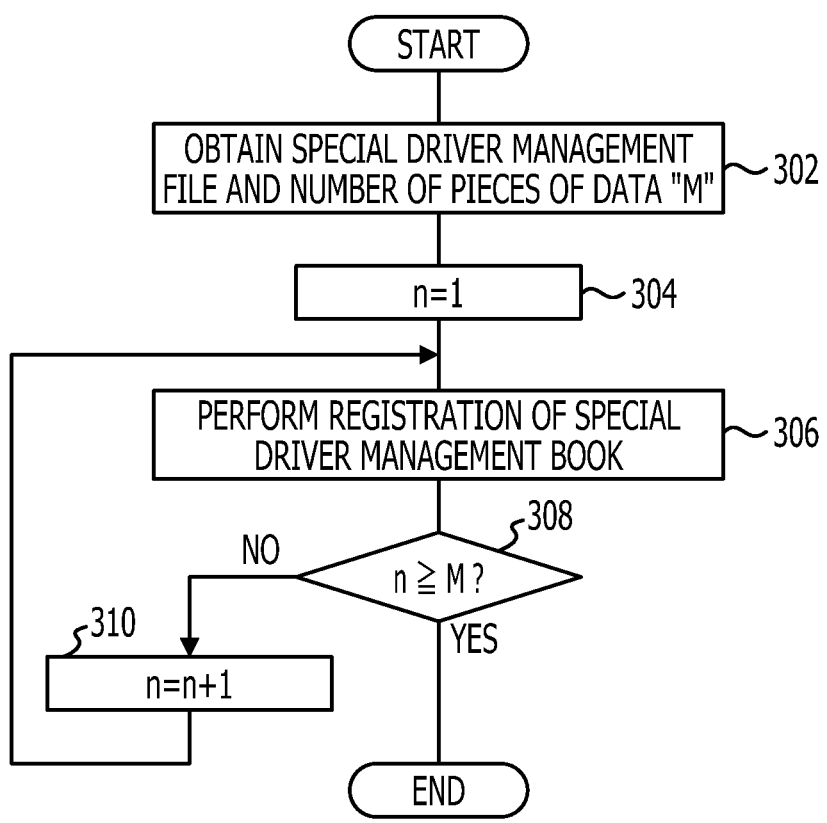
FIG. 11 is a flowchart indicating the detailed flow of the virtual file writing processing.

In Step 302 of FIG. 11, generation processing of a virtual file by the operating system is executed. The generation processing of a virtual file is processing to generate a virtual special driver management file from the special driver management file 82 that is stored as the setting file 80 of the storage unit 70 by the user. In Step 302, the special driver management file 82 is read, and the number of pieces of data "M" of the identification information 34 that includes an installation position and driver name of a PCI device that are stored as the special driver management file 82 is obtained (also see FIG. 12). The "M" is the number of lines of the special driver management file 82. In following Step 304, a variable "n" is initialized (n=1 is set), and the flow proceeds to Step 306. In Step 306, registration of the special driver management book 66 that is an n-th node is performed. The special driver management book 66 that is the n-th node corresponds to the identification information 34 including a position and driver name of a PCI device. In Step 308, the "No" is repeatedly determined until the variable "n" becomes the number of nodes of the special driver management book 66 (until n≥M is satisfied). When "No" is determined in Step 308, the variable "n" is incremented (n=n+1) in Step 310, and the flow returns to Step 306. On the other hand, when "Yes" is determined in Step 308, the routine ends.

Figure 12:
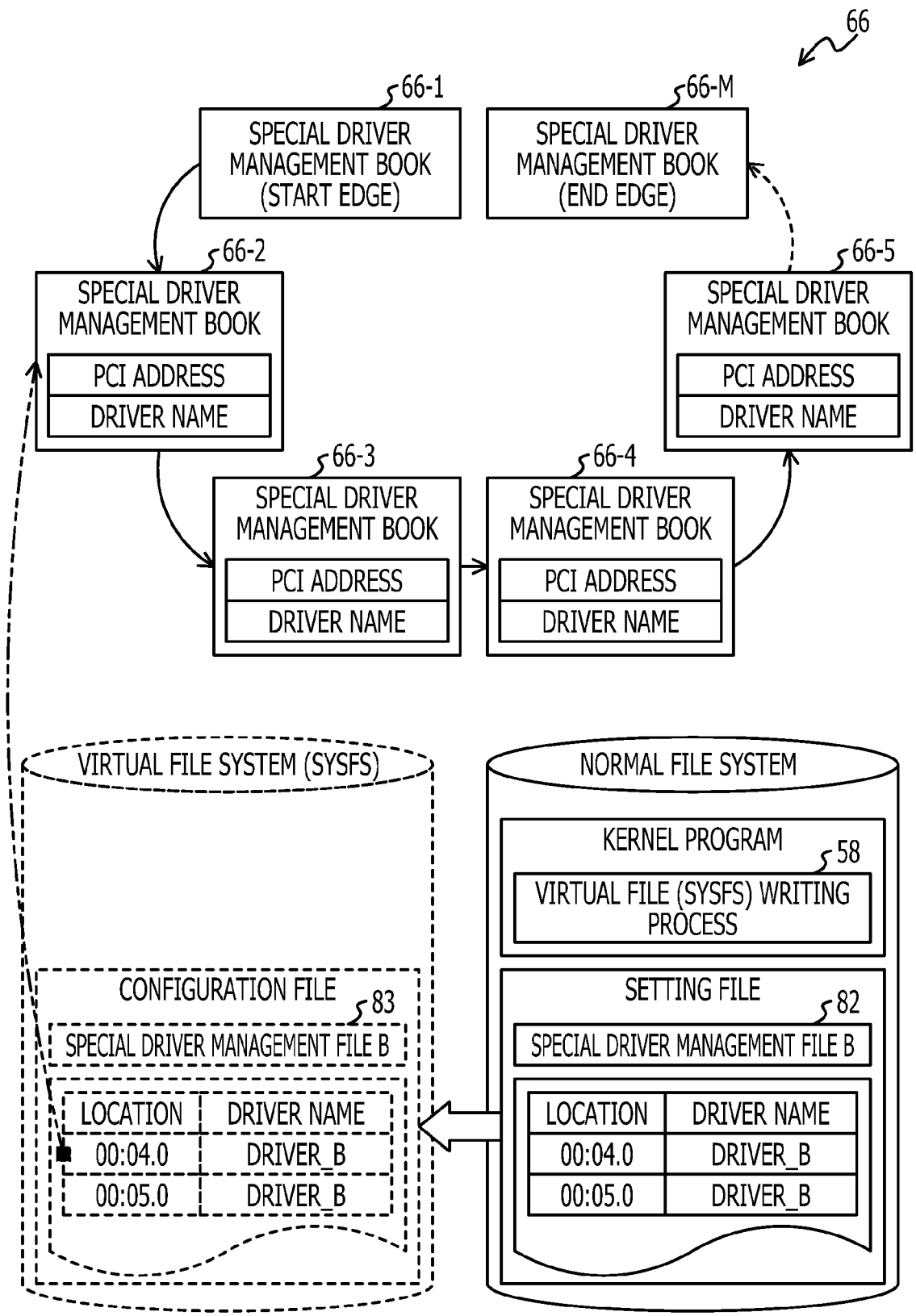
FIG. 12 is a schematic diagram illustrating a special driver management book having a link list structure.

FIG. 12 is a schematic diagram illustrating the special driver management book 66 having a link list structure. In FIG. 12, illustration of a pointer that indicates a next link and is included in each node is omitted. In the special driver management book 66, connection of nodes is performed in turn from the special driver management book 66-1 that is a node of start edge through special driver management books 66-2, 66-3, 66-4, . . . , 66-M ("M" indicates a natural number). In the first embodiment, the special driver management book 66 of each of the nodes includes a PCI address and a driver name that indicates the name of a device driver, as data. In the first embodiment, the PCI address may identify a device on the PCI bus 68 as a format of "bus number: device number. function number".

In addition, the special driver management book 66 is associated with data of a virtual file system. That is, as a normally substantial file system, a virtual file system is generated from the registered special driver management file 82, for example, by execution of a shell script by the operating system. Next, an example of the shell script by the operating system when the special driver management file 82 is registered as a file FILE_B is described. When the operating system is LINUX (registered trademark), a sysfsfile system may be used as a virtual file system. An autorun script at the time of turning-on of power supply is "/etc/rc.d/rc/local". Declaration of a target script is "#!/bin/sh". A contents of script is "cat FILE_B>/sys/kernel/FILE_A".

That is, the CPU 40 loads the virtual file the writing process 78 into the memory 50. The CPU 40 generates a virtual special driver management file 83 in the virtual file system (sysfsfile system) by executing a script by the loaded virtual file writing process 58. The special driver management book 66 may be generated by data such as a PCI address and a driver name that are included in the special driver management file 83 (correspondence relationship is illustrated by a two-dot chain line in FIG. 12).

Figure 13:
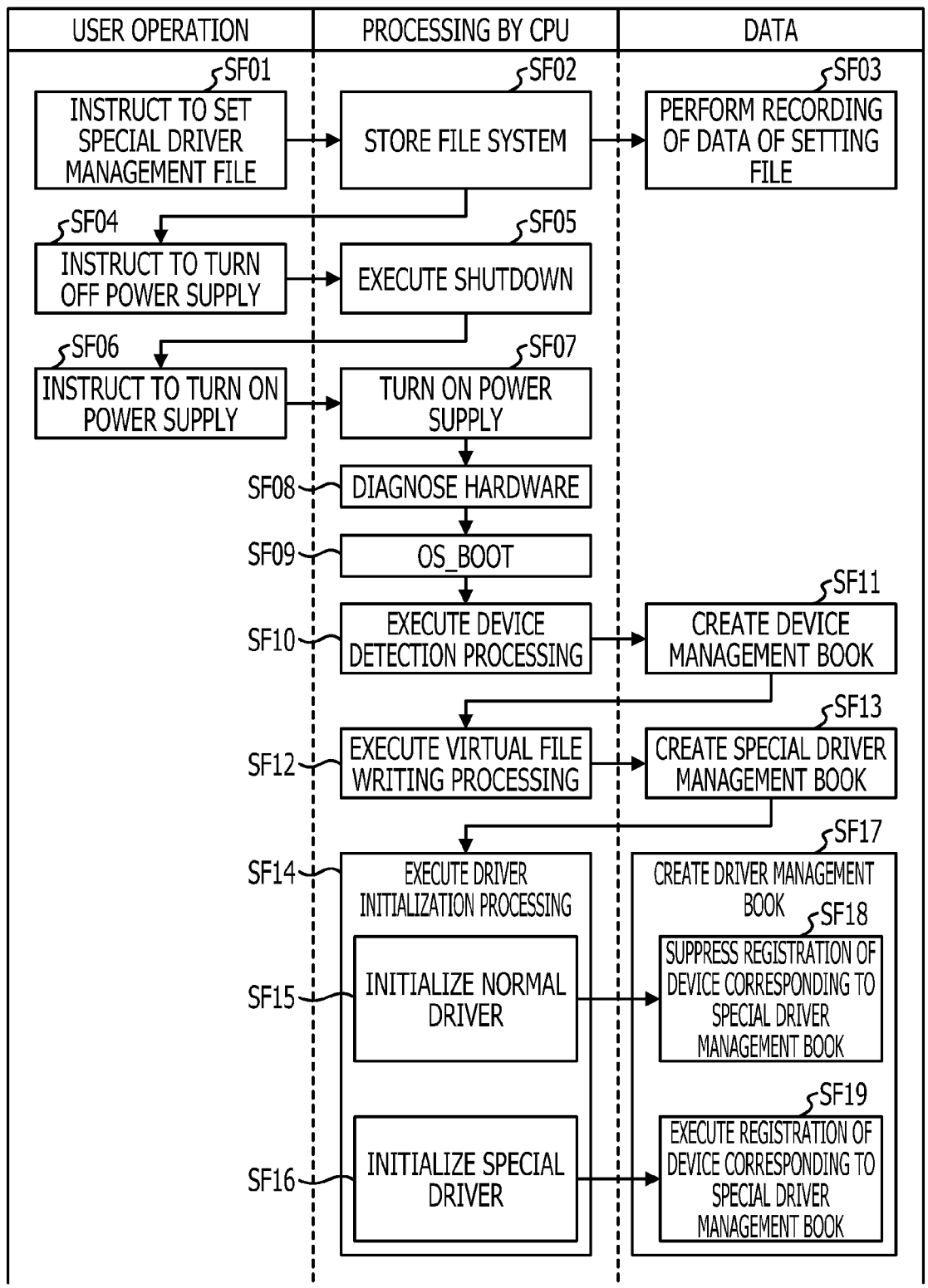
FIG. 13 is a sequential flow indicating a flow of processing in the information processing apparatus.

Next, a specific operation of the information processing apparatus 10 that is realized by the computer system 38 is described in detail with reference to FIG. 13. FIG. 13 is a sequential flow indicating a flow of processing when the information processing apparatus 10 is realized by the computer system 38.

First, an installation position and driver name of a PCI card are input as information by operating the computer system 38 by the user in order to register a target device driver to a target PCI device (Step SF01 of FIG. 13). The computer system 38 stores the information that indicates the installation position and driver name of the input PCI card in the storage unit 70 as information of the special driver management file 82 (Step SF02). By the processing to store the information of the special driver management file 82 in the storage unit 70, recording of data of a setting file (information of the special driver management file 82) that is used to register a special device driver to a certain installation position requested by the user is performed (Step SF03).

Next, in order to reflect the setting, turning-on of power supply to the computer system 38 is instructed by operating the computer system 38 by the user (Step SF04). The computer system 38 accepts the turning-off instruction and executes the instruction (shutdown) to terminate the operation of the computer system 38 (Step SF05). After the turning-off of power supply to the computer system 38, power supply to the computer system 38 is instructed to supply power to the computer system 38 (Step SF06). The computer system 38 accepts the power supply instruction, and power supply to the computer system 38 is executed (Step SF07). After that, in the computer system 38, hardware diagnosis processing is executed (Step SF08), and the operating system is started (OS_boot: processing to start the operating system (Step SF09) is executed).

After that, the computer system 38 executes the device detection processing in order to register a PCI card to a PIC bus (Step SF10). In the device detection processing, the CPU 40 loads the device detection process 76 into the memory 50 and executes the device detection process 56. At the time of execution of the device detection process 56, the device management book 64 is created (Step SF11). In Step SF11, the special driver management book 66 that is described later is not created, and registration of a device driver by the regular device management book 64 is performed.

After that, the computer system 38 executes the virtual file writing processing (Step SF12). The virtual file writing processing is processing to cause the CPU 40 to execute the virtual file the writing process 78 by the operating system. That is, in the virtual file writing processing, the CPU 40 loads the virtual file the writing process 78 into the memory 50 and executes the virtual file writing process 58. When the CPU 40 executes the virtual file writing process 58, the special driver management book 66 is created (Step SF13).

Next, the computer system 38 executes the driver initialization processing (Step SF14). The driver initialization processing is processing to cause the CPU 40 to execute the driver initialization process 74 by the operating system. That is, in the driver initialization processing, the CPU 40 loads the driver initialization process 74 into the memory 50 and executes the loaded driver initialization process 54. When the driver initialization process 54 is executed, the driver management book 62 is created (Step SF17). In the driver initialization processing, with reference to the special driver management book 66, regular registration of a device driver is suppressed for a device that is registered to the special driver management book 66 (Steps SF15 and SF18). In addition, in the driver initialization processing, a device driver that has been registered to the special driver management book 66 is registered to a PCI card registered to the special driver management book 66 (Steps SF16 and SF19).

By the above-described process, a desired device driver is registered to a desired PCI card by the user.

As described above, in the first embodiment, a PCI device may be associated with a device driver that is specified by the user using the special driver management file 82 based on identification information that is specified by the user. Thus, for a plurality of PCI devices each of which includes the identical combination of a vender ID and device ID (PCI cards in the first embodiment), a special device driver may be registered to a certain installation position. In addition, according to the first embodiment, registration of another device driver may be performed on a trial basis and the device driver may be verified and evaluated in order to avoid and suppress function reduction (level down) due to upgrade of a device driver.

Second Embodiment

In the above-described first embodiment, PCI address information of a PCI card is used as information that indicates an installation position of the PCI card. In a second embodiment, as information that indicates an installation position of a PCI card, a modification using a slot number is described with reference to FIG. 14. In the second embodiment, a configuration is substantially the same as the configuration of the above-described first embodiment, and an identical reference numeral is given to an identical portion, and the detailed description is omitted.

As an example of a computer system according to the second embodiment, in a large server, etc. in which a service processor includes an snmp manager function, a PCI address may be replaced with a slot number. That is, there is possibility that malfunction occurs when the PCI address is used as a user interface because the PCI address may varies depending on the number of mounted PCI cards, etc. Therefore, in the second embodiment, the replacement of a PCI address with a slot number may handle the PCI address that may vary depending on the number of mounted PCI card, etc.

Figure 14:
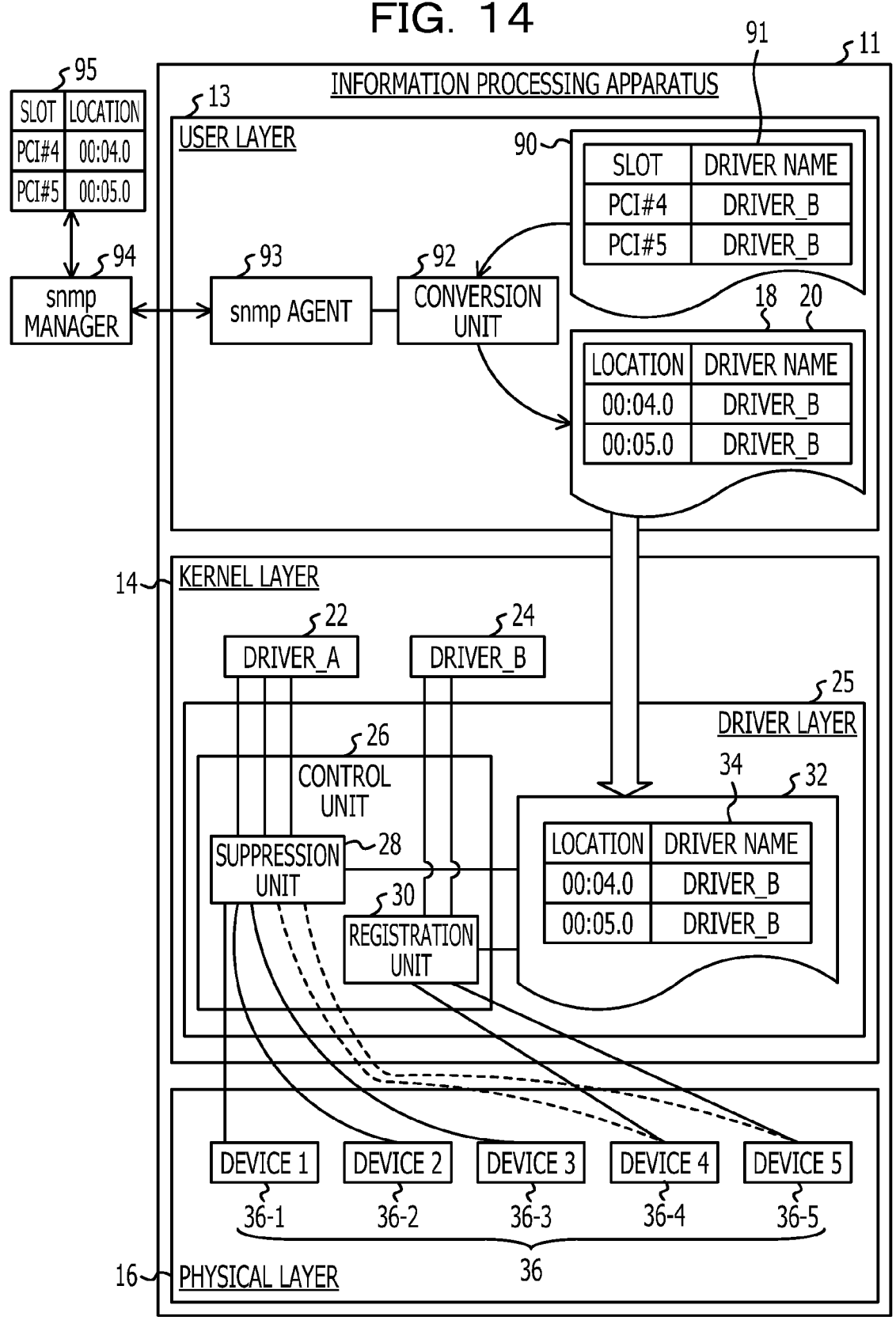
FIG. 14 is a block diagram illustrating a schematic configuration of an information processing apparatus according to a modification.

As illustrated in the example of FIG. 14, in the second embodiment, instead of the user layer 12 of FIG. 1, a user layer 13 is used that includes a conversion unit 92 that executes interconversion between a physical installation position and PCI address of a PCI card. For example, a specification area 90 and the input area 18 are included in the user layer 13. Identification information 91 that is obtained by associating a slot number as an installation position of a PCI card that is specified by the user with the driver name of a specified device driver is stored in the specification area 90. In addition, the user layer 13 includes a snmp agent 93. The snmp agent 93 transmits and receives data that indicate a correspondence relationship between a PCI address and a slot number to and from an snmp manager 94. The snmp manager 94 selects data, which indicates a corresponding correspondence relationship, from a table 95 of data on the correspondence relationship between the PCI address and the slot number, and outputs the data to the snmp agent 93. The conversion unit 92 includes a function that converts the identification information 91 of the specification area 90 into the identification information 20 of the input area 18.

Thus, the user may obtain a PCI address regardless of the number of mounted PCI cards, etc. merely by specifying a slot number as an installation position of a PCI card and the driver name of a device driver. In the second embodiment, for a PCI address that may vary depending on the number of mounted PCI cards, etc., the PCI address may be obtained regardless of the number of mounted PCI cards by using a slot number as the installation position of the PCI card.

The example has been described above in which the information processing apparatus 10 is realized by the computer system 38. However, the embodiments are not limited to the configuration, and various improvements and modifications are made without departing from the above-described scope of course.

In addition, the embodiments have been described above in which a program is stored (installed) in a storage unit beforehand, however, the embodiments are not limited to the example in which the program is stored in the storage unit beforehand. The program in the embodiments may be provided in the form of being recorded to a non-transitory computer readable recording medium such as a compact disc-read-only memory (CD-ROM) and a digital versatile disc-read only memory (DVD-ROM).

All documents, patent applications, and technical specifications that are described in this specification are herein incorporated by reference to the same extent as if that individual documents, patent applications, and technical specifications are incorporated by reference is described specifically and individually.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
a plurality of slots in which a plurality of same type of devices are installed;
a memory; and
a processor coupled to the memory and configured to:
associate each of the plurality of same type of devices with a first device driver;
receive identification information indicating a request to change a device driver associated with one or more devices designated among the plurality of same type of devices by a user to a second device driver from the first device driver, the identification information including location information of one or more slots in which the one or more devices being installed among the plurality of slots;
specify the one or more devices from among the plurality of same type of devices by referring to the location information of the one or more slots; and
change the device driver associated with the one or more devices from the first device driver to a second device driver.

2. The information processing apparatus according to claim 1,
wherein the identification information includes PCI (peripheral components interconnect) address information of the one or more devices as the location information and driver information including the second device driver, and
the processor is configured to:
determine, for each of the plurality of devices, whether the PCI address information of the device is included in the identification information;
associate the device with the first device driver, when it is determined that the PCI address information of the device is not included in the identification information; and
associate the device with the second device driver when it is determined that the PCI address information of the device is included in the identification information.

3. The information processing apparatus according to claim 2,
wherein the processor is configured to suppress an association of the device with the first device driver, when it is determined that the PCI address information of the device is included in the identification information.

4. The information processing apparatus according to claim 2,
wherein the processor is configured to:
create, for each of the plurality of devices, a first driver management book that includes the driver information and device-specific information including a device identification (ID) to be used to identify a type of the device and a vender ID to be used to identify a supply source of the device, and a device management book that includes the device-specific information and location information indicating the connection position of the device to a bus;
create a second driver management book that indicates a correspondence relationship between the location information and the driver information for each piece of information indicating the correspondence relationship between the location information and driver information stored in the memory; and
associate the device and the device driver based on the device management book and the second driver management book.

5. The information processing apparatus according to claim 4, wherein the second driver management book includes virtually created file information.

6. The information processing apparatus according to claim 4, wherein the bus is a peripheral component interconnect (PCI) bus.

7. The information processing apparatus according to claim 1,
wherein the identification information includes slot numbers of the one or more devices as the location information and driver information including the second device driver, and
the processor is configured to:
acquire PCI (peripheral components interconnect) address information of the one or more devices corresponding to the slot numbers by referring to a table that includes data indicating a correspondence relationship between a PCI address and a slot number, and
specify the one or more devices from among the plurality of same type of devices based on the acquired PCI address information.

8. The information processing apparatus according to claim 7, wherein the processor is, further configured to
generate a new identification information including the acquired PCI address information of the one or more devices and driver information including the second device driver.

9. An information processing method by an information processing apparatus including a plurality of slots in which a plurality of same type of devices are installed, the information processing method comprising:
associating each of the plurality of same type of devices with a first device driver;
receiving identification information indicating a request to change a device driver associated with one or more devices designated among the plurality of same type of devices by a user to a second device driver from the first device driver, the identification information including location information of one or more slots in which the one or more devices being installed among the plurality of slots;
specifying the one or more devices from among the plurality of same type of devices by referring to the location information of the one or more slots; and
changing the device driver associated with the one or more devices from the first device driver to a second device driver.

10. The information processing method according to claim 9, wherein the identification information includes PCI (peripheral components interconnect) address information of the one or more devices as the location information and driver information including the second device driver, and
wherein the determining includes determining, for each of the plurality of devices, whether the PCI address information of the device is included in the identification information,
the associating the device with the first driver includes associating the device with the first device driver when it is determined that the PCI address information of the device is not included in the identification information, and the associating the device with the second driver includes associating the device with the second device driver when it is determined that the PCI address information of the device is included in the identification information.

11. The information processing method according to claim 10,
wherein the information processing method further comprising:
suppressing an association of the device with the first device driver when it is determined that the PCI address information of the device is included in the identification information.

12. The information processing method according to claim 10, further comprising:
creating, for each of the plurality of devices, a first driver management book that includes the driver information and device-specific information including a device identification (ID) to be used to identify a type of the device and a vender ID to be used to identify a supply source of the device, and a device management book that includes the device-specific information and location information indicating the connection position of the device to a bus;
creating a second driver management book that indicates a correspondence relationship between the location information and the driver information for each piece of information indicating the correspondence relationship between the location information and driver information stored in the memory; and
associating a device and a device driver based on the device management book and the second driver management book.

13. The information processing method according to claim 12, wherein
the second driver management book includes virtually created file information.

14. The information processing method according to claim 12, wherein the bus is a peripheral component interconnect (PCI) bus.

15. A non-transitory computer-readable recording medium storing a program that causes an information processing apparatus to execute a process, the information processing apparatus-including a plurality of slots in which a plurality of same type of devices are installed, the process comprising:
associating each of the plurality of devices having the identical type with a first device driver;
receiving identification information indicating a request to change a device driver associated with one or more devices designated among the plurality of same type of devices by a user to a second device driver from the first device driver, the identification information including location information of one or more slots in which the one or more devices being installed among the plurality of slots;
specifying the one or more devices from among the plurality of same type of devices by referring to the location information of the one or more slots; and
changing the device driver associated with the one or more devices from the first device driver to a second device driver.

16. The recording medium according to claim 15, wherein the identification information includes PCI (peripheral components interconnect) address information of the one or more devices as the location information and driver information including the second device driver, and
wherein the determining includes determining, for each of the plurality of devices, whether the PCI address information of the device is included in the identification information,
the associating the device with the first driver includes associating the device with the first device driver when it is determined that the PCI address information of the device is not included in the identification information, and
the associating the device with the second driver includes associating the device with the second device driver when it is determined that the PCI address information of the device is included in the identification information.

17. The recording medium according to claim 16,
wherein the process further comprising:
suppressing an association of the device with the first device driver when it is determined that the PCI address information of the device is included in the identification information.

18. The recording medium according to claim 16, the process further comprising:
creating, for each of the plurality of devices, a first driver management book that includes the driver information and device-specific information including a device identification (ID) to be used to identify a device name and a vender ID to be used to identify a supply source, and a device management book that includes the device-specific information and location information indicating the connection position of the device to the bus;
creating a second driver management book that indicates a correspondence relationship between the location information and the driver information for each piece of information indicating the correspondence relationship between the location information and driver information stored in the memory; and
associating a device and a device driver based on the device management book and the second driver management book.

19. The computer-readable recording medium according to claim 18,
wherein the second driver management book includes virtually created file information.

* * * * *